United States Patent [19]

Matsumoto et al.

[11] 4,455,480
[45] Jun. 19, 1984

[54] RICE COOKER-WARMER

[75] Inventors: Yukio Matsumoto, Nagoya; Terutaka Aoshima, Toyohashi; Katsuharu Matsuo, Aichi, all of Japan

[73] Assignee: Tokyo Shibaura Denki Kabushiki Kaisha, Kawasaki, Japan

[21] Appl. No.: 354,791

[22] Filed: Mar. 4, 1982

[30] Foreign Application Priority Data

Mar. 10, 1981 [JP] Japan .................................. 56-34743

[51] Int. Cl.³ .............................................. H05B 1/02
[52] U.S. Cl. ..................... 219/497; 219/486; 219/505; 219/442; 219/491; 99/325
[58] Field of Search ................ 219/436, 438, 441, 442, 219/492, 493, 490, 491, 497, 483, 486, 502, 508, 505; 99/325; 307/39–41, 117

[56] References Cited

U.S. PATENT DOCUMENTS

| | | | |
|---|---|---|---|
| 4,241,288 | 12/1980 | Aoshima et al. | 219/442 |
| 4,300,037 | 11/1981 | Padden | 219/492 |
| 4,320,285 | 3/1982 | Koether | 219/441 |
| 4,330,702 | 5/1982 | Cheng | 219/442 |
| 4,362,923 | 12/1982 | Aoshima | 219/441 |

*Primary Examiner*—M. H. Paschall
*Attorney, Agent, or Firm*—Cushman, Darby & Cushman

[57] ABSTRACT

The output of a first bridge circuit including as one component element a thermistor for detecting the temperature of a pan is compared with a preset value in a first operational amplifier. The first operational amplifier provides a low level output when the detected temperature is below a predetermined temperature. When this low level output is supplied to a second operational amplifier, the output thereof goes to a high level to turn on a transistor so as to energize a relay for passing current to a cooking heater. When a cooking end temperature is reached, the internal resistance of the thermistor is reduced, and as a result the output of the first operational amplifier goes to a high level, causing the output of the second operational amplifier to go to a low level. Thus, a warming heater is energized while the cooking heater is de-energized.

14 Claims, 6 Drawing Figures

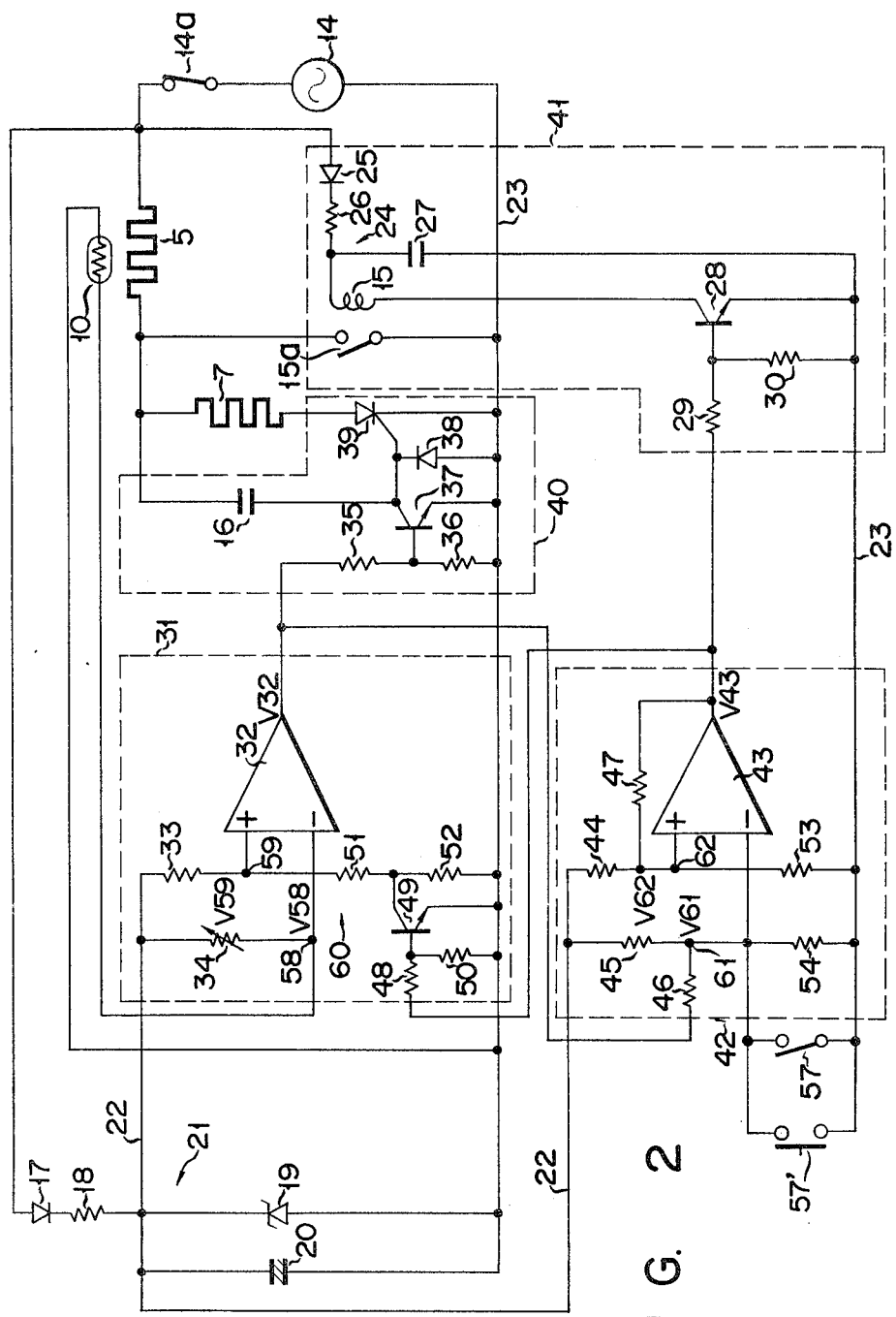
F I G. 2

RICE COOKER-WARMER

BACKGROUND OF THE INVENTION

This invention relates to cooker-warmers using electric heaters and having a cooking function and a warming function.

Where rice is cooked with a rice cooker having an electric heater and the cooked rice is warmed also with an electric heater, use is made of a temperature switch for the purpose of switching a power supply from the side of the cooking heater to the side of the warming heater in accordance with the detection of a cooking end temperature. For detecting temperature a mechanical switch, for instance one making use of changes with temperature in the magnetic permeability of a magnetic shunt alloy, is used. Such a mechanical temperature switch, however, is incapable of accurately setting an operating temperature. Therefore, the cooking end temperature is not fixed but fluctuates, so that it is impossible to always obtain satisfactory results while rice cooking. Also, if this temperature switch is used to provide the rice cooker with a warming function, it is possible that the temperature of the cooked rice is excessively low or excessively high, resulting in such inconvenience as the burning of the cooked rice.

SUMMARY OF THE INVENTION

An object of the invention is to provide a cooker-warmer, with which the cooking of rice can be terminated upon reaching of a preset temperature and the cooked rice can be automatically held warmed at a predetermined temperature, and also which, if desired permits cooking in a cooking mode for a desired period of time by releasing the function of switching from cooking mode over to automatic warming mode.

According to the invention, there is provided a cooker-warmer comprising a heat-sensitive element for obtaining an electric signal corresponding to the temperature of a pan, a cooking heater circuit including a cooking heater for heating the pan, a warming heater circuit including a warming heater for warming the pan, a heater switching circuit for selectively energizing said cooking heater circuit and warming heater circuit, a temperature setting circuit for setting a cooking end temperature and a warming temperature, a comparator for comparing the output signal from the heat-sensitive element and a preset cooking end temperature value from said temperature setting circuit to produce a cooking end signal when said cooking heater circuit is being energized and comparing the output signal from said heat-sensitive element and a preset warming temperature value from said temperature setting value to produce a warming temperature control signal when the warming heater circuit is being energized, and a cooking mode selecting circuit connected with said comparator, said temperature setting circuit and said heater switching circuit for controlling said heater switching circuit and said temperature setting circuit to switch from a preset cooking and temperature to a preset warming temperature.

BRIEF DESCRIPTION OF THE DRAWINGS

FIG. 2 is a circuit diagram showing the circuit construction of the embodiment of FIG. 1;

DETAILED DESCRIPTION OF THE PREFERRED EMBODIMENTS

Figure 1:
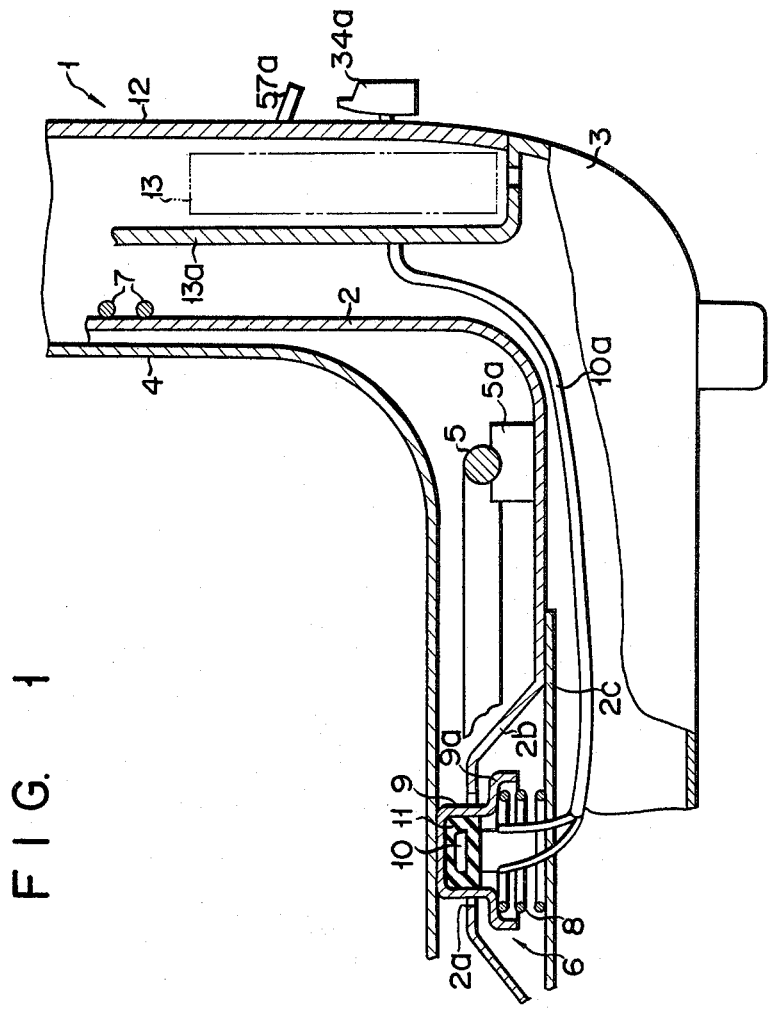
FIG. 1 is a fragmentary longitudinal sectional view showing part of one embodiment of the rice cooker-warmer according to the invention.

Now, an embodiment of the invention will be described with reference to the drawings. Referring to FIG. 1, a body frame 1 comprises an inner frame 2 and an outer frame 3, and a heat insulating material (not shown) is provided between these frames. A pan 4 is removably disposed inside the inner frame 2. In a space between the inner bottom of the inner frame 2 and pan 4, an annular cooking heater 5 is supported on an insulating support 5a. A heat sensor mechanism 6 is provided at the center of the heater 5. An insulated warming heater 7 is wound on the outer periphery of the inner frame 2.

The heat sensor mechanism 6 is formed at the center of the bottom of the inner frame 2, and it is provided between a projecting member 2b having a central see-through hole 2a and a support member 2c bonded to the underside of the inner frame 2 at a position corresponding to the projecting member 2b. Between the projecting member 2b and support member 2c, a coil spring 8 and a heat transfer cap 9 urged thereby against the bottom of the pan 4 are provided. The end of the heat transfer cap 9 outwardly projects from the projecting member 2b through the see-through hole 2a, and in the absence of the pan 4 a flange portion 9a of the cap 9 engages the inner wall of the projecting member 2b surrounding the hole 2a. Inside the end portion of the heat transfer cap 9, a thermistor 10 is molded in a heat-conductive molding member 11. The terminals of the thermistor 10 are led through leads 10a connected to an electric part unit 13 mounted on the back side of an operating panel 12 mounted on the side wall of the outer frame 3. A heat insulation plate 13a is provided to surround the electric part unit 13 for preventing heat of radiation for the cooking heater 5 and warming heater 7 from reaching the unit 13. The leads 10a penetrate the heat insulation plate 13a and are connected to the unit 13. On the operating panel 12 manual knobs 34a and 57a for setting the cooking end temperature and holding temperature respectively are provided.

The electric circuitry of this embodiment will now be described with reference to FIG. 2. Referring to FIG. 2, the cooking heater 5 is connected at one end through a power source switch 14a to one end of a commercial AC power source 14, for instance of 60 Hz and 120 volts, and at the other end to one end of the warming heater 7, a relay switch 15a and a capacitor 16. The aforementioned one end of the AC power source 14 is further connected through the power source switch 14a and also through a diode 17 and a resistor 18 to one end of a zener diode 19 and a capacitor 20. The elements 17 to 20 constitute a rectifier 21, and a positive DC line 22 is led out from the common juncture to the resistor 18, zener diode 19 and capacitor 20. The zener diode 19 and capacitor 20 are connected at their other end to one end of a common line 23 which is in turn connected at the other end to the other end of the AC power source 14. The aforementioned one end of the AC power source 14 is further connected through the power source switch 14a to one end of a diode 25 constituting a rectifier 24. The cathode of the diode 25 is connected through a resistor 26 to one end of a capacitor 27 and a relay coil 15. The other end of the capacitor 27 is connected to the common line 23, and the other end of the relay coil 15 is connected to the collector of a transistor 28, which has its emitter connected to the common line 23 and its base connected to the juncture between resistors 29 and 30. The other end of the resistor 30 is connected to the common line 23.

The positive DC line 22 is connected through a resistor 33 to a non-inversion input terminal of an operational amplifier 32 in a comparator 31, and also connected through a variable resistor 34 to an inversion input terminal of the operational amplifier. The thermistor 10 is connected between this inversion input terminal and the common line 23. The output terminal of the operational amplifier 32 is connected through resistors 35 and 36 to the common line 23, and the juncture between the resistors 35 and 36 is connected to the base of a transistor 37. The transistor 37 has its emitter connected to the common line 23 and its collector connected to the other end of the capacitor 16, the cathode of a diode 38 and the control gate of a thyristor 39. The diode 38 has its anode connected to the common line 23, and the thyristor 39 has it anode connected to one of the warming heater 7 and its cathode connected to the common line 23. A block 40 defined by dashed line constitutes a warming operation controller, and a block 41 defined by a dashed line constitutes a heater switching circuit.

The positive DC line 22 is further connected through a resistor 44 to a non-inversion input terminal of an operational amplifier 43 in a function switching circuit 42 and also connected through a resistor 45 to an inversion input terminal of the operational amplifier. The inversion input terminal is connected through a resistor 46 to the output terminal of the operational amplifier 32. A resistor 47 is connected between the non-inversion input terminal and output terminal of the operational amplifier 43, and the output terminal thereof is connected to the other end of the resistor 29 and also connected through a resistor 48 to the base of a transistor 49. The transistor 49 also has its base connected through a resistor 50 to the common line 23, while its emitter is directly connected to the common line. Its collector is connected through a resistor 51 to the non-inversion input terminal of the operational amplifier 32 and also connected through a resistor 52 to the common line 23.

The non-inversion and inversion input terminals of the operational amplifier 43 are connected through respective resistors 53 and 54 to the common line 23. A switch 57 and a touch switch 57' both as function selecting devices are connected in parallel with each other across the resistor 54.

Now, the operation of the embodiment shown in FIGS. 1 and 2 will be described by also having reference to FIG. 3. In the first place, the operation of rice cooking will be described. In this case, the function selecting switch 57 is held "off". Although not shown, the pan 4 is filled with rice and a quantity of water necessary for cooking the rice. When the pan 4 is inserted into the inner frame 2 as shown in FIG. 1, the heat transfer cap 9 is pushed downwards against the spring force of the spring 8 by the weight of the pan, and the top portion of the cap 9 is held in close contact with the underside of the pan 4.

At an instant t0, the power source switch 14a has been turned on, and positive DC voltages appear on the positive DC line 22 and on the collector of the transistor 28. First, the switch 57' is instantly operated to bring the level of V61 to zero as shown in FIG. 3(B). In this state, the thermistor 10 is not yet heated, and its internal resistance is high. Therefore, the voltage V58 at the juncture 58 between the variable resistor 34 and thermistor 10 assumes a value higher than the voltage V59 at the juncture between the resistors 33 and 51 connected to the non-inversion input terminal of the operational amplifier 32 (as shown in (E) in FIG. 3). The resistors 33, 34, 51 and 52 and thermistor 10 constitute a bridge circuit 60, with the juncture 58 constituting a temperature signal output terminal and the juncture 59 constituting a reference voltage output terminal. In the instant situation, the voltage at the non-inversion input terminal of the operational amplifier 32 is thus higher than the voltage at the inversion input terminal, and the output voltage V32 is at an L (low) level (as shown in (A) in FIG. 3). Thus, the transistor 37 remains "off", and the thyristor 39 is rendered conductive to cause slight current through the heaters 5 and 7 only during the positive half of the waveform of the AC power source 14.

Figure 3:
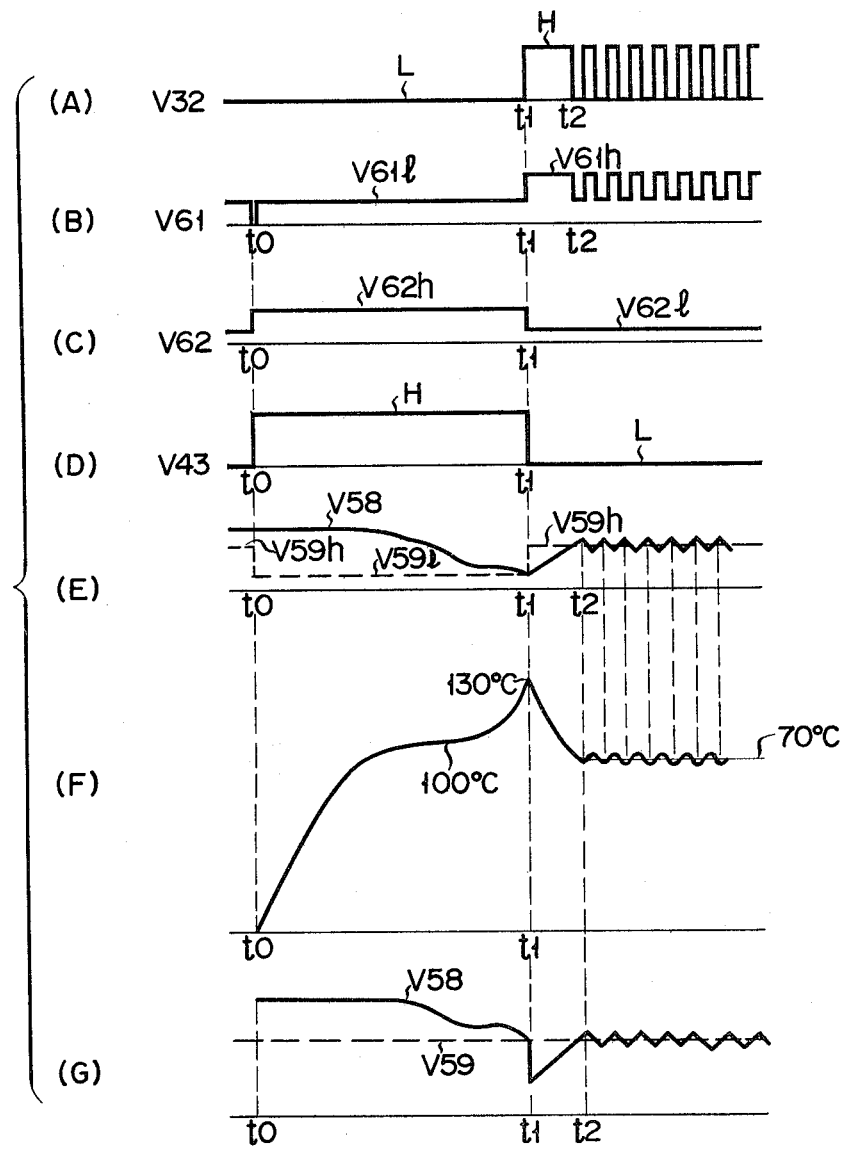
FIG. 3 is a voltage waveform chart for illustrating the operation of the circuit of FIG. 2.

Meanwhile, since the output voltage V32 of the operational amplifier 32 is at the L level, the voltage V61 at the point connected to the inversion input terminal of the operational amplifer 43 is a low level voltage V61l (as shown in (B) in FIG. 3). On the other hand, the voltage V62 at the point 62 of the non-inversion input terminal assumes a high level V62h (as shown in (C) in FIG. 3). Consequently, the voltage V43 at the output terminal of the operational amplifier 43 goes to an H (high) level (as shown in (D) in FIG. 3). With this H level output voltage V43 the transistors 28 and 49 are turned on. When the transistor 28 is turned on, the output from the rectifier 24 is coupled through the relay coil 15 to close a normally open relay switch 15a thereof, whereby the cooking heater 5 constituting the cooking heater circuit is directly coupled to the AC power source 14. As a result, heat is generated from the heater 5 to heat the pan 4 and raise the temperature of the thermistor 10.

Meanwhile, when the transistor 49 is turned on, the resistor 52 is short-circuited by the transistor 49, thus causing the voltage V59 at the junction 59 to change from the H level voltage V59h to L level V59l as shown by the dashed line in (E) in FIG. 3. This L level voltage V59l is set as the cooking end voltage.

When the temperature of the pan 4 is elevated to reach 100° C. as shown in (E) in FIG. 3 due to heat generation from the cooking heater 5, water in the pan 4 begins to boil. As the temperature of the pan 4 is increased, the internal resistance of the thermistor 10 is reduced to reduce the voltage V58 at the juncture 58 as shown in (E) in FIG. 3. When water in the pan 4 totally disappears, the temperature of the pan 4 turns to increase sharply from 100° C., and eventually reaches 130° C. at an instant t1 as shown in (F) in FIG. 3. This temperature of 130° C. is the cooking end temperature preset with adjustment of the resistance of the variable resistor 34 by manipulating the knob 34a, and with the decrease of the internal resistance of the thermistor 10 a voltage relation V58<V59l takes place. Thus, at the instant t1 the output voltage V32 of the operational amplifier 32 goes to H level as shown in (A) while the voltage V61 at the juncture 61 becomes H level voltage V61h as shown in (B). Since at this time the voltage V62 at the point 62 is at the L level V62 as shown in (C), the output voltage V43 of the operational amplifier 43 goes to the L level as shown in (D), thus turning off the transistors 28 and 49.

When the transistor 28 is turned off, the relay coil 15 is de-energized to open the relay switch 15a, whereby the cooking heater 5 is disconnected from the AC power source 14. When the transistor 49 is turned off, the resistor 52 is inserted again in the bridge circuit 60 to increase the voltage V59 at the reference point 59 to the level V59h as shown by dashed line in (E). This voltage level V59h is the warming preset level. While the output voltage V32 of the operational amplifier 32 is at the H level, the transistor 37 is "on" so that the thyristor 39 is not turned on. Thus, during this time neither cooking heater 5 nor warming heater 7 is energized, and the temperature of the pan 4 is gradually reduced from 130° C. This temperature is reduced at an instant t2 to, for instance, 70° C. (as shown in (F) in FIG. 3), which corresponds to the warming preset voltage V59h. As the temperature is reduced from 130° C. to 70° C., the internal resistance of the thermistor 10 is increased to increase the voltage V58 at the juncture 58 as shown in (E), and a relation V58>V59h comes to force at the instant t2.

For this reason, at the instant t2 the output voltage V32 of the operational amplifier 32 goes again to the L level, causing the voltages V61 and V62 to go to their respective L levels V61l and V62l (as shown in (A) to (C) in FIG. 3). At this time, the transistor 37 is turned off while the transistor 28 and 49 are "off". Thus, the thyristor 39 is rendered conductive to cause current through the cooking heater 5 and warming heater 7 only during the positive half of the waveform of the AC power source 14. The pan 4 is thus heated, and with the reduction of the internal resistance of the thermistor 10 a voltage relation V58<V59h is eventually met, whereupon the output voltage V32 of the operational amplifier 32 goes to the H level. When this state sets in, the thyristor 39 is no longer turned on at all. After the instant t2, the temperature is varied with a small temperature width with respect to the warming preset point at 70° C. as the center temperature, that is, it is substantially held at 70° C., as shown in (F) in FIG. 3. The rice cooking and subsequent warming operation are carried out in the manner as described above. Since the temperature detection and on-off control of power supply to the heaters are effected by the electric circuit, the cooking end temperature and warming temperature preset can be steady and stable, and satisfactory rice cooking can be obtained.

Now, the operation of the embodiment of FIGS. 1 and 2 will be described in connection with the case of preparing rice soup. In this case, the switch 57 is turned on by operating the knob 57a of the function selecting switch 57. For preparing rice soup the proportion of water with respect to rice is increased compared to the case of rice cooking. When the power source switch 14a is turned on in this state, the voltage V61 on the juncture 61 is forcibly fixed to zero since the resistor 54 is short-circuited by the switch 57. Thus, the output voltage V43 of the operational amplifier 43 is held at the H level to hold the transistors 28 and 49 in the "on" state. This state is held irrespective of the internal resistance of the thermistor 10, and the warming operation as described above will not come to force but the heater 5 is held energized at all time. Thus, the user may turn off the power source switch 14a at a desired time while observing the state of the rice soup in the pan 4.

When carrying out cooking with the function selecting switch 57 held "off", by reducing the resistance of the variable resistor 34 with the manual operation member 34a the cooking end preset value V59l is increased from the voltage V58 at the point 58 in the case previously described. In this case the cooking end preset temperature determined by the thermistor 10 is increased that much, and rice being cooked is prone to be blackened or burned by overheating. The extent of blackening of rice may be suitably set by adjusting the resistance of the variable resistor 34.

Figure 4:
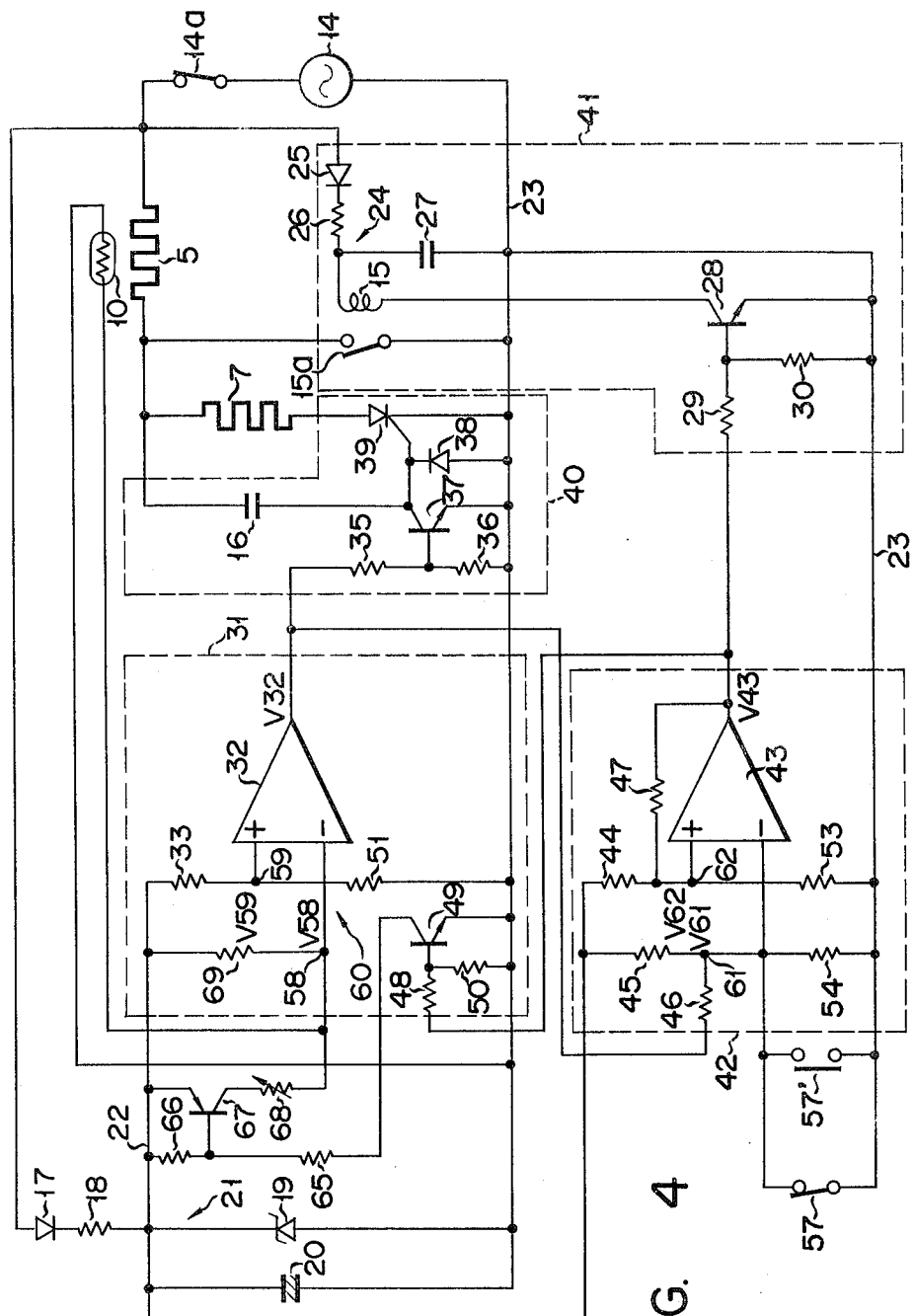
FIG. 4 is a circuit diagram showing a modification of the embodiment of FIG. 2.

FIG. 4 shows a modification of the embodiment of FIG. 2. Corresponding parts to those in FIG. 2 are designated by like reference symbols. In the modification of FIG. 4, resistor 51 is directly connected to the common line 23, and the collector of transistor 49 is connected through series resistors 65 and 66 to positive DC line 22. The juncture between the resistors 65 and 66 is connected to the base of transistor 67, which has its emitter connected to the positive DC line 22 and its collector connected through variable resistor 68 to the invention input terminal of operational amplifier 32. In this modification, a resistor 61 is used in lieu of the variable resistor 34 in the case of FIG. 2. Also, a push button switch 57' is provided in parallel with function selecting switch 57 connected to the inversion input terminal of the operational amplifier 43. For the rest, the construction is the same as the preceding embodiment of FIG. 2.

Now, the operation of the modification of FIG. 4 will be described.

When making ordinary rice cooking, the switch 57 is turned off, and then the power source switch 14a is closed. At this time, by temporarily depressing the push button switch 57', a cooking instruction is delivered to bring about a relation V62>V61. As a result, the output voltage V43 of the operational amplifier 43 goes to the H level to turn on the transistor 28, whereby the cooking heater 5 is energized. Also, since the voltage V43 is at the H level, the transistor 49, and hence the transistor 67, is "on", and at instant t1 the voltage V58 at the inversion input terminal of the operational amplifier 32 assumes a predetermined level determined by the variable resistor 68 (as shown in (G) in FIG. 3).

When the temperature of the pan 4 reaches 130° C. at the end of the cooking, the voltage V58 becomes lower than the voltage V59 due to the reduction of the internal resistance of the thermistor 10, thus causing the output voltage V32 of the operational amplifier 32 to go to the H level. Thus, a voltage relation V61>V62 is brought about, whereupon the output voltage V43 of the operational amplifier 43 is changed to the L level to turn off the transistor 28 so as to stop energization of the cooking heater 5. When the temperature of the pan 4 is reduced to the neighborhood of 70° C. at an instant t2 in this state, the voltage V32 goes to the L level to turn off the transistor 37. Thus, the thyristor 39 is rendered "on" to cause current through the warming heater 7 and cooking heater 5 only during the positive half of the waveform of the power source 14, that is, the warming state is brought about.

For the continuous cooking operation, the function selecting switch 57 is held "on", and thus the transistor 28 is held "on" irrespective of the internal resistance of the thermistor 10. The operation in this case is the same as described earlier in connection with FIG. 2.

Figure 5:
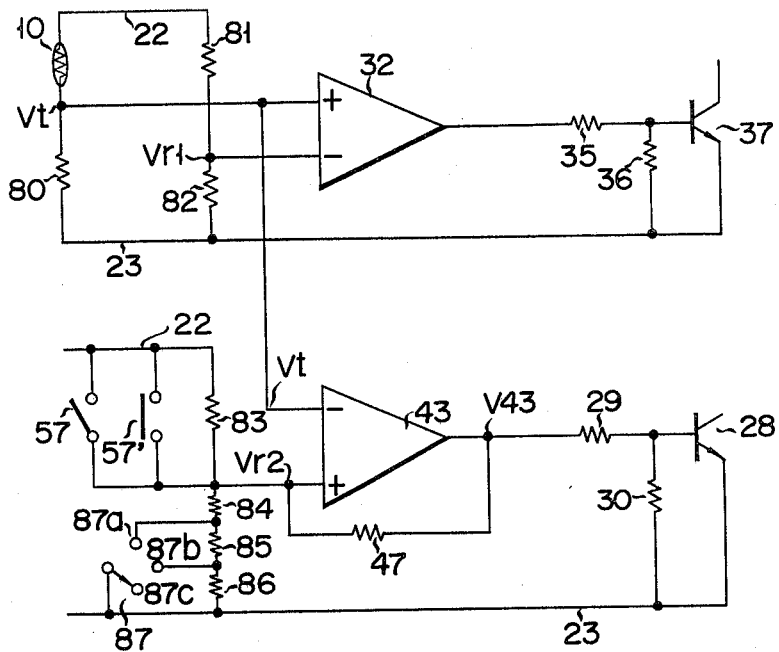
FIG. 5 is a circuit diagram showing an essential part of a different embodiment of the invention.

FIG. 5 shows a different embodiment of the invention. In this embodiment, the power source circuit and heater circuit are the same as those shown in FIG. 2, so they are not shown here. In FIG. 5, thermistor 10 and resistor 80 are connected in series between positive DC line 22 and common line 23, and the juncture between them is connected to the non-inversion input terminal of operational amplifier 32. Series resistors 81 and 82 are also connected between the lines 22 and 23, and their juncture is connected to the inversion input terminal of the operational amplifier 32.

The juncture between the thermistor 10 and resistor 80 is further connected to the inversion input terminal of operational amplifier 43. Resistors 83 to 86 are connected in series between the lines 22 and 23, and the juncture between the resistors 83 and 84 is connected to the non-inversion input terminal of the operational amplifier 43. Function selecting switch 57 and touch switch 57' are connected in parallel across the resistor 83. The juncture between the resistors 84 and 85 and the juncture between the resistors 85 and 86 are connected to respective fixed contacts 87a and 87b of a selection switch 87, the movable contact of which is connected to the line 23. The switch 87 has a further fixed contact 87c which is connected to nowhere. Resistor 47 is connected between the output terminal and inversion input terminal of the operational amplifier 43.

Figure 6:
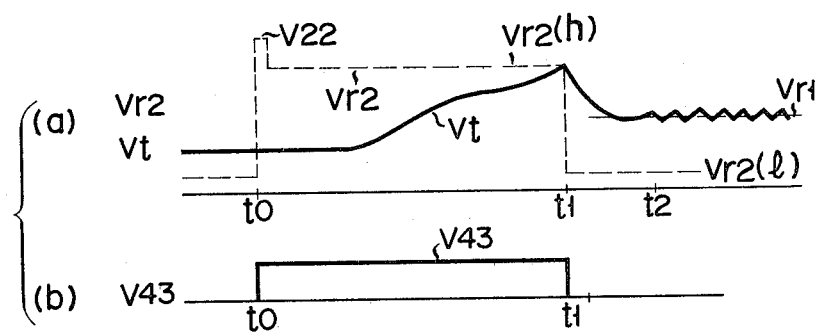
FIG. 6 is a voltage waveform chart for illustrating the operation of the circuit of FIG. 5.

Now, the operation of the embodiment of FIG. 5 will be described by also having reference to FIG. 6. The voltage Vt at the juncture between the thermistor 10 and resistor 80 is the cooking temperature voltage, and the voltage Vr1 at the juncture between the resistors 81 and 82 is the warming preset voltage. Further, the voltage Vr2 at the inversion input terminal of the operational amplifier 43 is a function set voltage. These voltages are individually set as shown in (a) in FIG. 6. At an instant t0 the power source switch is closed, and at the same time the touch switch 57' is momentarily depressed. The switch 57 is assumed to be open at this time. As a result, the voltage Vr2 is momentarily increased up to the source voltage on the line 22 and is immediately thereafter returned to Vr2(h). It is assumed that the movable contact of the switch 87 is in the illustrated position connected to the fixed contact 87c. Since this voltage V22 is higher than Vt, the output voltage V43 of the operational amplifier 43 goes to H level at the instant t0 as shown in (b) in FIG. 6. As a result, the transistor 28 is turned on, whereby the cooking heater is energized. As the pan is heated, the internal resistance of the thermistor 10 is reduced. The voltage is thus gradually increased, and a relation Vr2(h)<Vt is brought about at an instant t1. As a result, the output voltage V43 of the operational amplifier 43 goes to L level as shown in (b) in FIG. 6, thus turning off the transistor 28 to de-energize the cooking heater.

As the internal resistance of the thermistor 10 is increased with decrease of the temperature thereof, i.e., the temperature of the pan, the voltage Vt is gradually reduced, and when this voltage becomes lower than the warming voltage Vr1 at an at an instant t2 the output voltage of the operational amplifier 32 goes to L level to turn off the transistor 37. Thus, like the embodiment of FIG. 2 the thyristor is rendered "on" to cause current through the warming heater and cooking heater only during the positive half of the waveform of the power source. Subsequently, the output of the operational amplifier 32 alternately goes to the H and L levels according to slight changes in the internal resistance of the thermistor 10, and the warming operation is obtained in this way. The warming preset voltage Vr1 is always set higher than the function set voltage Vr2(l), so that during the warming operation the output voltage of the operational amplifier 43 will never go to the H level and the transistor 28 is held "off".

The selection switch 87 is provided for setting the cooking end temperature, and the set temperature in the illustrated position of the switch is highest. When the switch is switched to the position of the fixed contact 87a, the voltage Vr2 is set to a low level, and in this case the cooking end temperature is lowest. Thus, with the switch at the position of the contact 87a the temperature may be set such that the rice being cooked is slightly blackened.

When the function selecting switch 57 is closed, the operational amplifier 43 always provides the H level output irrespective of the detected temperature voltage Vt by the thermistor 10. In this case, the transistor 28 is held "on", and the cooking heater is thus continuously energized to obtain continuous cooking operation.

As has been described in the foregoing, according to the invention the temperature of the pan is taken out by a heat-sensitive element such as a thermistor in the form of an electric signal which is used to control the rice cooking and warming operations with the electric circuit. Thus, it is possible to obtain a versatile cooker-warmer, which can eliminate fluctuations of the finish of cooking and also permits continuous cooking.

What we claim is:

1. A cooker-warmer comprising:
   heat-sensitive means for generating an electric temperature signal corresponding to the temperature of a pan;
   a cooking heater circuit including a cooking heater for heating the pan;
   a warming heater circuit including a warming heater for warming the pan;
   heater switching means for selectively rendering one of said cooking heater circuit and said warming heater circuit energizable in response to a control signal;
   temperature setting means, for selectively setting one of a cooking signal, related to a predetermined cooking end temperature sitting means, and a warming signal, related to a predetermined warming temperature which is lower than said predetermined cooking end temperature, in response to a setting signal;
   comparing means, for comparing said temperature signal with the output of said temperature setting means and generating a comparison signal related thereto; and
   cooking mode selecting means, responsive to said comparison signal, for generating both: (1) said control signal to cause said heater switching means to energize said cooking heater circuit and (2) said setting signal to cause said temperature setting means to generate said cooking signal until said temperature signal reaches said cooking signal, and then generating both: (1) said setting signal to cause said temperature setting means to generate said warming signal and (2) said control signal to cause said heater switching means to enable said warming heater circuit to be energized when said temperature signal is less than said warming signal.

2. The cooker-warmer according to claim 1 further comprising a cooking mode selection circuit for causing continuous energization of said cooking heater circuit by inhibiting the operation of said cooking mode selecting means.

3. The cooker-warmer according to claim 2, wherein said comparing means includes a first bridge circuit having said heat-sensitive means as one component element, and a first operational amplifier supplied with a preset voltage output of said first bridge circuit and an output related to said temperature signal.

4. The cooker-warmer according to claim 3, wherein said cooking mode selecting means includes a second bridge circuit having an input terminal supplied with the output of said comparing means and a second operational amplifier supplied with the output of said second bridge curcuit, the output of said second operational amplifier being said control signal.

5. The cooker-warmer according to claim 4, wherein said cooking mode selection circuit includes a function selecting switch for setting the potential at the input terminal of said second bridge circuit to a predetermined value.

6. The cooker-warmer according to claim 3, wherein said warming heating circuit includes a transistor on-off controlled according to the output voltage of said first operational amplifier and a thyristor turned off when said transistor is turned off, said thyristor being connected in series with said warming heater across a power source.

7. The cooker-warmer according to claim 6, wherein said warming heater is connected in series with said cooking heater across said power source.

8. The cooker-warmer according to claim 4, wherein said heater switching means includes a transistor on-off controlled according to the output of said second operational amplifier, a relay having a relay coil energized while said transistor is "on" and a normally open relay switch, and circuit means for connecting said cooking heater to the power source in response to the closure of said normally open relay switch.

9. The cooker-warmer according to claim 4, wherein said first bridge circuit includes a variable resistor connected in series with said heat-sensitive means across a power supply and first to third resistors connected in series across said power supply, said first operational amplifier has an inverted input terminal connected to the juncture between said heat-sensitive means and variable resistor and a non-inverted input terminal connected to the juncture between said first and second resistors, and said temperature setting means includes a transistor having the collector and emitter connected to the respective opposite terminals of said third resistor and the base connected to the output terminal of said second operation amplifier.

10. The cooker-warmer according to claim 4, wherein said first bridge circuit includes a first resistor connected in series with said heat-sensitive means across a power supply and second and third resistors connected in series across said power supply, said first operational amplifier has an inverted input terminal connected to the juncture between said heat-sensitive means and said first resistor and a non-inversion input terminal connected to the juncture between said second and third resistors, and said temperature setting means includes fourth and fifth resistors and a first transistor connected in series across said power supply, means for coupling the output voltage of said second operational amplifier to the base of said first transistor, and a second transistor having the base connected to the juncture between said fourth and fifth resistors, the emitter connected to the power supply and the collector connected through a variable resistor to said non-inversion input terminal of the first operational amplifier.

11. The cooker-warmer according to claim 5, which further comprises a touch switch connected in parallel with said function selecting switch, for producing a cooking instruction.

12. The cooker-warmer according to claim 3, wherein said first bridge circuit includes a first resistor connected in series with said heat-sensitive means across a power supply and second and third resistors connected in series across said power supply, said first operational amplifier has a non-inversion input terminal connected to the juncture between said heat-sensitive means and said first resistor and an inverted input terminal connected to the juncture between said second and third resistors, and said cooking mode selecting means includes a second operational amplifier having a non-inversion input terminal and an inversion input terminal connected to the juncture between said heat-sensitive means and said first resistor, a fourth resistor and at least a portion of said temperature setting means connected in series across said power supply and means for connecting juncture between said fourth resistor and said temperature setting means to the non-inversion input terminal of the second operational amplifier.

13. The cooker-warmer according to claim 12, which further comprises a function selecting switch and a cooking instruction switch connected in parallel with said first resistor.

14. The cooker-warmer according to claim 12, wherein said temperature setting means includes a plurality of resistors connected in series between the non-inversion input terminal of said second operational amplifier and a common line, and a selection switch having fixed contacts individually connected to respective ones of junctures each between adjacent ones of said plurality of resistors.

* * * * *